United States Patent [19]

Ryu

[11] Patent Number: 5,940,197
[45] Date of Patent: Aug. 17, 1999

[54] OPTICAL ADD-DROP DEVICE

[75] Inventor: Shiro Ryu, Tokyo, Japan

[73] Assignee: Kokusai Denshin Denwa Kabushiki Kaisha, Tokyo, Japan

[21] Appl. No.: 08/825,061

[22] Filed: Mar. 27, 1997

[30] Foreign Application Priority Data

Apr. 2, 1996 [JP] Japan ................................. 8-102044

[51] Int. Cl.$^6$ .................................................. H04B 10/00
[52] U.S. Cl. ............................ 359/152; 359/120; 359/127
[58] Field of Search ................................. 359/115, 120, 359/121, 123, 125, 152, 173, 127; 385/5, 16, 24, 17

[56] References Cited

U.S. PATENT DOCUMENTS 4,989,199  1/1991  Rzeszewski ............................. 359/123
5,194,977  3/1993  Nishio ..................................... 359/128

*Primary Examiner*—Rafael Bacares
*Attorney, Agent, or Firm*—Pollock, Vande Sande & Amernick

[57] ABSTRACT

The self-oscillation frequencies of injection-locked laser devices 5-1 through 5-M are preset to the frequency of the signal light to be transmitted by the optical add-drop device, and the self-oscillation frequencies of the injection-locked laser devices 6-1 through 6-N are preset to the frequency of the signal light to be branched by this device. Wavelength-division multiplexed signal light inputted from an input optical line 1 is split in an optical splitter 2 and inputted to the injection-locked laser devices. Signal light whose wavelength has been set for the injection-locked laser devices 5-1 through 5-M is amplified by these injection-locked laser devices 5-1 through 5-M and inputted to an optical combiner 10. Signal light whose wavelength has been set for the injection-locked laser devices 6-1 through 6-N is outputted to branching optical lines 8-1 through 8-N. Signal light outputted from inserting optical lines 9-1 through 9-L is inputted to the optical combiner 10 together with the signal light from the injection-locked laser devices 5-1 through 5-M and is outputted to an output optical line 11. It is thus possible to provide an optical add-drop device in which the wavelength and number of split or inserted signal light can be set as needed.

9 Claims, 5 Drawing Sheets

OPTICAL ADD-DROP DEVICE

BACKGROUND OF THE INVENTION

1. Technological Field

The present invention relates to an optical add-drop device suitable for use in wavelength-division multiplexed optical communications systems, wavelength-division multiplexed optical communications networks, and other optical communications systems.

2. Background Technology

In recent years optical add-drop devices for splitting or inserting only certain wavelengths have been proposed for the optical undersea branching devices used in the optical submarine cable systems using wavelength-division multiplexed optical communications systems (for example, K. P. Jones, et al., "Optical wavelength add-drop multiplexer in installed submarine WDM network," Electronics Letters, Vol. 31, No. 24, pp. 2117–2118, 1995).

An example of the structure of such a conventional optical add-drop device is depicted in FIG. 5. In the drawing, 50 is an input optical line, 51 and 52 are optical lines, 53 is a branching optical line, 54 is an inserting optical line, and 55 is an output optical line. In addition, 60 and 61 are optical circulators, 70 is an optical fiber grating, 80 through 82 are terminals for inputting light signals to and outputting them from the optical circulator 60, and 83 through 85 are terminals for inputting optical signals to and outputting them from the optical circulator 61.

Here, the aforementioned optical fiber grating 70 is such that the composition of a silica optical fiber having a germanium-doped core is varied, as is the retractive index, by means of an interference pattern formed by irradiating the fiber with strong ultraviolet light from two directions, and a function of the grating is to reflect light signals whose wavelengths correspond to the pattern pitch. In addition, the aforementioned optical circulators 60 and 61 operate in such a way that signals inputted from the terminals are rotated in the directions shown by the arrows in the drawing. For example the optical circulator 60 operates in such a way that light signals inputted to the terminal 80 are outputted from the terminal 81, light signals inputted to the terminal 81 are outputted from the terminal 82, and light signals inputted to the terminal 82 are outputted from the terminal 80.

In an optical add-drop device with such a structure, wavelength-division multiplexed signal light inputted to the input optical line 50 is inputted to the input terminal 80 of the optical circulator 60 and, as described above, is outputted to the optical line 51 via the terminal 81. The wavelength-division multiplexed signal light outputted to the optical line 51 is inputted to the optical fiber grating 70. Of the inputted wavelength-division multiplexed signal light, only signal light of prescribed wavelength is reflected in the direction of the optical line 51 due to the filtering function of the optical fiber grating 70, and signal light having other wavelengths is transmitted to the optical line 52.

The signals of the prescribed wavelength that have been reflected by the aforementioned optical fiber grating 70 and sent out to the optical line 51 are inputted to the terminal 81 of the optical circulator 60, outputted from the terminal 82, and launched into the branching optical line 53. Meanwhile, signals of other wavelengths that have been transmitted through the aforementioned optical fiber grating 70 are inputted to the terminal 83 of the optical circulator 61 via the optical line 52, outputted from the terminal 84, and launched into the output optical line 55.

Meanwhile, when signal light having the same prescribed wavelength as the signal light outputted to the aforementioned branching optical line 53 is inputted from the inserting optical line 54, this signal light is inputted from the terminal 85 to the aforementioned optical circulator 61 and outputted from the terminal 83. This signal light is propagated through the optical line 52 and inputted to the optical fiber grating 70, and this signal light is reflected into the optical line 52 by the action of the optical fiber grating 70 because, as described above, the wavelength of this signal light is the same as the prescribed wavelength reflected by the optical fiber grating 70. The reflected signal light is again inputted to the optical circulator 61 through the terminal 83 and is launched to the output optical line 55 via the terminal 84.

Thus, in a conventional optical add-drop device, only the signal light that has the prescribed wavelength determined by the optical fiber grating 70 is outputted to the branching optical line 53 out of the wavelength-division multiplexed signal light inputted from the input optical line 50, and signal light that has the same wavelength as the signal light outputted to the branching optical line 53 can be inserted from the inserting optical line 54, making it possible to the reuse the light wavelength.

However, the conventional optical add-drop device described above has the following properties 1 through 3.

(1) The wavelength of signal light involved in branching or insertion is fixed by the wavelength of the optical fiber grating 70 and cannot be changed.

(2) The number of signal lights involved in branching or insertion is fixed at one, making it impossible to branch or insert a plurality of signal lights.

(3) The wavelength of signal light outputted by a branching optical line and the wavelength of signal light inputted from an inserting optical line must be the same.

It is therefore difficult to change the number or the wavelength of signal lights involved in branching or insertion once the system has been built, making it impossible to create a flexible network structure.

In view of the above, an object of the present invention is to provide an optical add-drop device which allows an arbitrary number of signal lights having arbitrary wavelengths to be branched or inserted and which does not require that the wavelength of signal light outputted from a branching optical line be the same as the wavelength of signal light inputted from an inserting optical line.

SUMMARY OF THE INVENTION

Aimed at attaining the stated object, an optical add-drop device of the present invention comprises an optical splitter for splitting wavelength-division multiplexed light signals inputted from an input optical line between two or more optical lines, a first injection-locked laser device group composed of injection-locked laser devices connected in a corresponding manner to some of the aforementioned two or more optical lines, a second injection-locked laser device group composed of injection-locked laser devices connected in a corresponding manner to the rest of the aforementioned two or more optical lines, optical lines connected to the corresponding outputs of the injection-locked laser devices belonging to the aforementioned first injection-locked laser device group, branching optical lines connected to the corresponding outputs of the injection-locked laser devices belonging to the aforementioned second injection-locked laser device group, inserting optical lines for inputting light signals from the outside, and an optical combiner for combining the outputs of the aforementioned inserting optical lines and the optical lines connected to the corresponding outputs of the injection-locked laser devices belonging to the aforementioned first injection-locked laser device group.

Another optical add-drop device of the present invention comprises an optical splitter for splitting wavelength-division multiplexed light signals inputted from an input optical line between two or more optical lines, a plurality of injection-locked laser devices connected in a corresponding manner to the aforementioned two or more optical lines, an optical combiner for combining the outputs of a plurality of optical lines, and at least one optical switch having a first state, in which a direct connection is made between the input-side optical lines connected to the output sides of the aforementioned injection-locked laser devices and the output-side optical lines connected to the input side of the aforementioned optical combiner, and a second state, in which a connection is made between the input-side optical lines and the branching optical lines for outputting light signals to the outside and between the aforementioned output-side optical lines and the inserting optical lines for inputting light signals from the outside.

Yet another optical add-drop device of the present invention comprises an optical splitter for splitting wavelength-division multiplexed light signals inputted from an input optical line between two or more optical lines, a plurality of injection-locked laser devices connected in a corresponding manner to the aforementioned two or more optical lines, at least one optical switch having a first state in which a direct connection is made between input-side optical lines and output-side optical lines, and a second state in which a connection is made between the input-side optical lines and branching optical lines and between the output-side optical lines and inserting optical lines, an optical combiner for combining the outputs of a plurality of optical lines, branching optical lines for outputting light signals to the outside, and inserting optical lines for inputting light signals from the outside, wherein the outputs of the aforementioned plurality of injection-locked laser devices are connected in a corresponding manner to the input-side optical lines of the aforementioned optical switch, to the optical lines connected to the aforementioned optical combiner, or to the splitting optical lines, and the aforementioned inserting optical lines are connected to the aforementioned optical switch or the aforementioned optical combiner.

Still another optical add-drop device of the present invention further comprises an optical receiver for receiving light signals that have been split by the aforementioned optical splitter, and a control device for receiving the output of the aforementioned optical receiver and controlling the self-oscillation frequency of the aforementioned injection-locked laser devices.

An additional optical add-drop device of the present invention comprises an optical modulator driver connected to the output of the aforementioned optical receiver, and an optical modulator that is connected to the output of the optical modulator driver and that is inserted into one of the optical lines connected to the outputs of the injection-locked laser devices belonging to the aforementioned first injection-locked laser device group.

Using a plurality of injection-locked laser devices makes it possible to branch or insert an arbitrary number of signal lights having arbitrary wavelengths because of the selective control of branched signal light and of signal light transmitted by the optical add-drop device. In addition, the transmitted wavelength-division multiplexed signal light can be amplified, and the noise reduced.

Furthermore, the settings of the branched or transmitted signal light can be remotely controlled to superpose signal light with the intensity-modulated control signals for controlling the self-oscillation frequency of the injection-locked laser devices.

DESCRIPTION OF THE PREFERRED EMBODIMES

Figure 1:
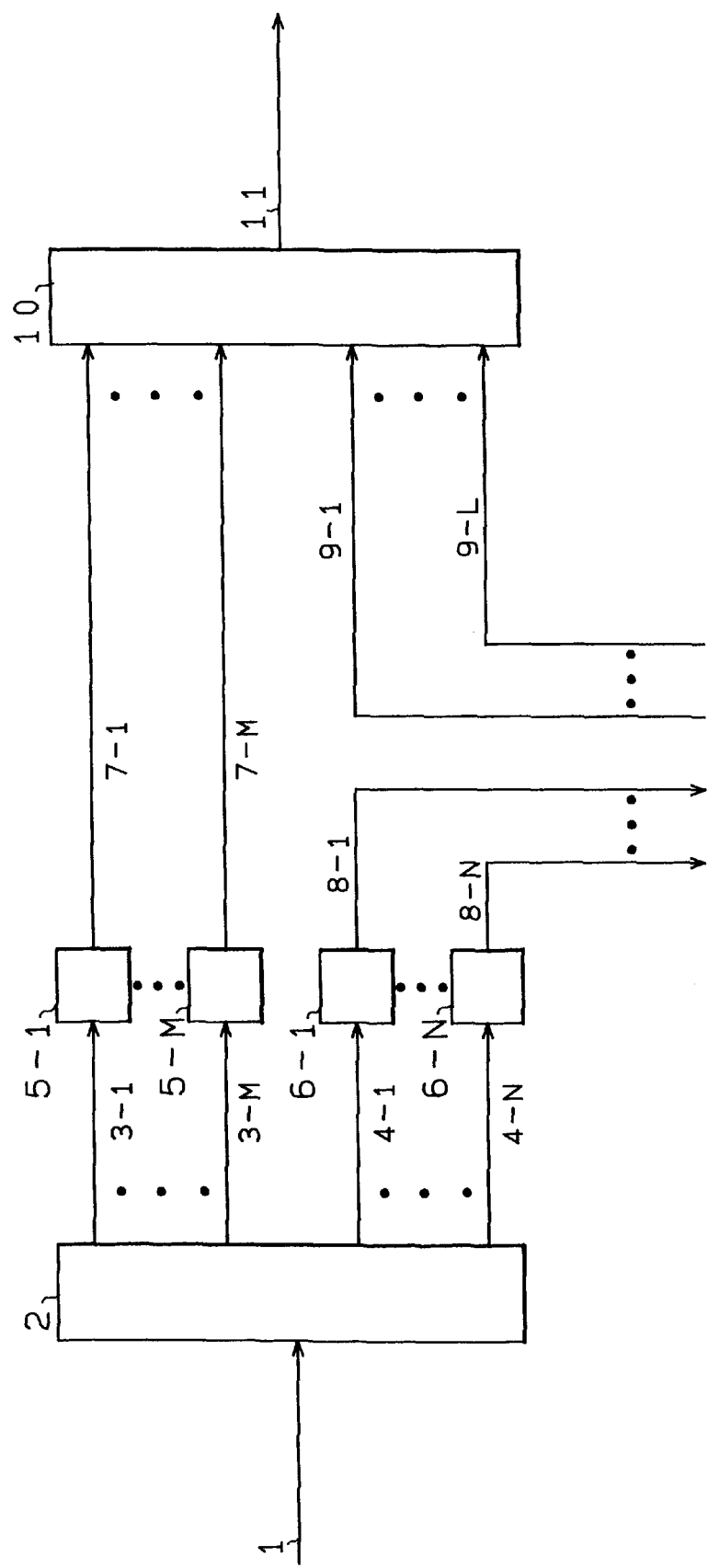
FIG. 1 is a diagram depicting the first embodiment of the optical add-drop device of the present invention.

FIG. 1 depicts the structure of the first embodiment of the optical add-drop device of the present invention. In the drawing, 1 is an input optical line; 2 is an optical splitter; 3-1 through 3-M, 4-1 through 4-N, and 7-1 through 7-M are optical lines; 8-1 through 8-N are branching optical lines, and 9-1 through 9-L are inserting optical lines. In addition, 5-1 through 5-M and 6-1 through 6-N are injection-locked laser devices, 10 is an optical combiner, and 11 is an output optical line.

In such a structure, a wavelength-division multiplexed light signal inputted via the input optical line 1 is split by the optical splitter 2 and outputted to the optical lines 3-1 through 3-M and 4-1 through 4-N. The light signals that are split among the optical lines 3-1 through 3-M and 4-1 through 4-N are inputted to the injection-locked laser devices 5-1 through 5-M and 6-1 through 6-N provided in a corresponding manner.

Injection-locked laser devices are generally used as optical amplifiers for phase-modulated light or frequency-modulated light. The phenomenon utilized in such laser devices is that when the frequency of the input light signal is close to the self-oscillation frequency of the laser device and the amplitude has a certain magnitude, the laser device locks to the input signal frequency and synchronously oscillates. A resulting property is that synchronous oscillation light is outputted when a frequency close to this self-oscillation frequency has been inputted. Another property is that when a wavelength-division multiplexed signal light has been inputted to an injection-locked laser device, only the signal light whose wavelength is close to the self-oscillation frequency of the injection-locked laser device is filtered and the synchronous oscillation outputted, whereas signal light having other wavelengths is significantly attenuated (if necessary, refer to Japanese Patent Applications 6-319496, 7-27731, and 7-308500).

The optical add-drop device of the present invention actively utilizes the properties of such injection-locked laser devices. The portion of wavelength-division multiplexed light that has been inputted to the input optical line 1 and that is to be transmitted by the optical add-drop device is handled in such a way that the self-oscillation frequencies of the injection-locked laser devices 5-1 through 5-M connected to the aforementioned optical lines 3-1 through 3-M are each set equal or close to the frequency of the signal light. In addition, the signal light to be branched in the optical add-drop device is handled in such a way that the self-oscillation frequencies of the injection-locked laser devices 6-1 through 6-N connected to the aforementioned optical lines 4-1 through 4-N are each set equal or close to the frequency of the signal light. The self-oscillation frequencies of the injection-locked laser devices can be set by controlling the driving current, the operation temperature, or other operation conditions.

Therefore, the injection-locked laser devices 5-1 through 5-M are such that, out of all the wavelength-division multiplexed light signals inputted from the corresponding optical lines 3-1 through 3-M, only the signal light whose frequency is equal or close to the self-oscillation frequency that has been set for each of the injection-locked laser devices 5-1 through 5-M is amplified in the injection-locked laser devices 5-1 through 5-M and outputted to the optical lines 7-1 through 7-M. In other words, out of all the wavelength-division multiplexed light signals inputted from the optical line 3-1 to the injection-locked laser device 5-1, only the light signals whose frequency is close to the self-oscillation frequency that has been set for the injection-locked laser device 5-1 are amplified in this laser device 5-1 and outputted to the optical line 7-1, whereas light signals having other frequencies are attenuated. The same is true for the other injection-locked laser devices 5-2 through 5-M: only the light signals whose frequencies are equal or close to the self-oscillation frequencies of the laser devices 5-2 through 5-M are amplified and outputted to the optical lines 7-2 through 7-M.

In addition, the injection-locked laser devices 61 through 6-N are such that, of all the wavelength-division multiplexed light signals inputted from the corresponding optical lines 4-1 through 4-N, only the signal light whose frequency is equal or close to the self-oscillation frequency that has been set for each of the injection-locked laser devices 6-1 through 6-N is amplified and outputted to the branching optical lines 8-1 through 8-N, whereas signal light having other frequencies is attenuated.

Meanwhile, signal light of the frequency to be inserted is inputted from the aforementioned inserting optical lines 9-1 through 9-L, combined in the optical combiner 10 with the signal light transmitted by the aforementioned injection-locked laser devices 5-1 through 5-M, and outputted to the output optical line 11. Thus, of all the wavelength-division multiplexed light signals inputted from the input optical line 1, only the signal light whose frequency is equal or close to the self-oscillation frequencies that are set for the injection-locked laser devices 5-1 through 5-M is transmitted by the optical add-drop device, only the signal light whose frequency is equal to or close to the self-oscillation frequency that is set for the injection-locked laser devices 6-1 through 6-N is branched, and the signal light inputted from the inserting optical lines 9-1 through 9-L is inserted.

The total number of the aforementioned injection-locked laser devices 5-1 through 5-M and 6-1 through 6-N should be equal to or greater than the number of the wavelength-division multiplexed light signals being inputted, and the numbers M and N can be properly set in accordance with the actual system structure under a condition that M and N are equal to or less than the number of frequencies of the wavelength-division multiplexed light signals. For example, a system structure of maximum flexibility can be obtained by setting M=10 and N=10 when the number of wavelength-division multiplexed light signals being inputted corresponds to 10 waves. The output of injection-locked laser devices that are not necessary can be reduced to zero by switching off their power supply to prevent any adverse effect on the system.

In addition, it is not always necessary to achieve a match between the number N of signal lights being branched and the number L of signal lights being inserted or between the wavelengths of signal lights being branched and the wavelengths of signal lights being inserted in such an optical add-drop device. Such a structure allows the necessary number of signal lights of required wavelength to be branched and inserted, yielding a highly flexible optical add-drop device. In addition, using injection-locked laser devices makes it possible to amplify the inputted phase- or frequency-modulated, wavelength-division multiplexed signal lights and to further reduce the noise.

It should be noted that when an attempt is made to obtain a structure of maximum flexibility in the first embodiment described above, the maximum number of the injection-locked laser devices provided, in terms of the total number of the injection-locked laser devices 5-1 through 5-M for transmission and the injection-locked laser devices 6-1 through 6-N for branching, must be twice the number of wavelengths contained in the wavelength-division multiplexed light signals inputted, resulting in an undesirable increase in the scale of the device structure. The second embodiment of the present invention, in which the number of injection-locked laser devices provided can be reduced in view of the above, will be described with reference to FIG. 2. For the sake of simplicity, the constituent elements in FIG. 2 that are identical to those in FIG. 1 above have been assigned identical symbols, and their detailed description omitted.

As is evident in the drawings, this embodiment is different from the first embodiment depicted in FIG. 1 in that an optical switch 20 is provided between the optical combiner 10 and the injection-locked laser device 6-1 for branching. In the drawing, 200 and 203 are movable contacts of the optical switch 20, and 201, 202, 204, and 205 are fixed contacts. The optical switch 20 is switched by the interlocking of the two movable contacts 200 and 203 in such a way that in the first state the movable contact 200 and the fixed contact 201, as well as the movable contact 203 and the fixed contact 204, are connected, as shown in the drawing, and in the second state the movable contact 200 and the fixed contact 202 are connected, as are the movable contact 203 and the fixed contact 205.

In addition, 8'-1 is a branching optical line connected to the fixed contact 202 of the optical switch 20, and 9'-1 is an inserting optical line connected to the aforementioned fixed contact 205. The movable contact 200 is connected to an optical line 8-1, which receives the output from the aforementioned injection-locked laser device 6-1, the fixed contacts 201 and 204 are connected to each other, and the movable contact 203 is connected to the optical combiner 10 via an optical line 9-1.

Due to such a structure, of all the wavelength-division multiplexed light signals inputted to the aforementioned optical line 4-1, only the signal light whose frequency is equal or close to the self-oscillation frequency that has been set for the injection-locked laser device 6-1 is amplified in the injection-locked laser device 6-1 and outputted to the optical line 8-1 in the first state of the optical switch 20; outputted to the optical line 9-1 via the movable contact 200, fixed contacts 201 and 204, and movable contact 203 of the optical switch 20; and inputted to the optical combiner 10. In other words, the signal light is transmitted by the optical add-drop device.

On the other hand, when the aforementioned optical switch 20 is brought into the second state, of all the wavelength-division multiplexed light signals inputted to the aforementioned optical line 4-1, only the signal light whose frequency is equal or close to the self-oscillation frequency that has been set for the injection-locked laser device 6-1 is amplified in the injection-locked laser device 6-1, outputted to the optical line 8-1, and outputted to the branching optical line 8'-1 via the movable contact 200 and fixed contact 202 of the aforementioned optical switch 20. In other words, the signal light is branched. At this time, the signal light inputted from the inserting optical line 9'-1 is outputted to the optical line 9-1 via the fixed contact 205 and movable contact 203 of the aforementioned optical switch 20 and inputted to the aforementioned optical combiner 10.

Thus, this embodiment allows the optical switch 20 to selectively use the injection-locked laser device 6-1 connected to the output side of the switch as a means for selecting the signal light to be transmitted or as a means for selecting the signal light to be branched by the switching of the optical switch 20.

Figure 2:
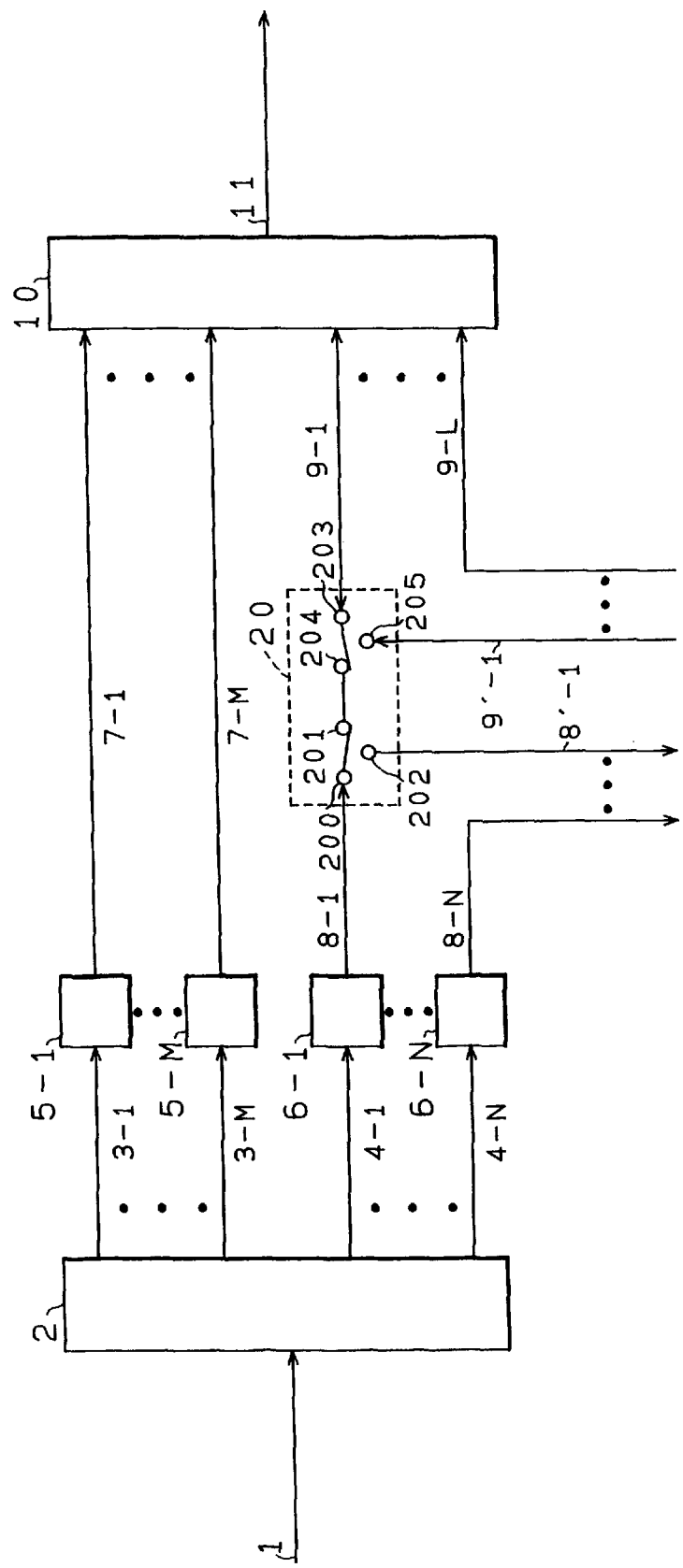
FIG. 2 is a diagram depicting the second embodiment of the optical add-drop device of the present invention.

Although FIG. 2 depicts an example in which a single optical switch 20 is inserted at the output side of the injection-locked laser device 6-1, it is apparent that another possibility is to provide a plurality of optical switches 20 and to connect these switches in the same manner to the output sides of a plurality of injection-locked laser devices.

The number of injection-locked laser devices can be reduced because these injection-locked laser devices can be used either for transmission or for branching as a result of the fact that an optical switch is inserted at the output side of an injection-locked laser device or a plurality of injection-locked laser devices. It is, for example, also possible to obtain a system structure of maximum flexibility by providing the same number of injection-locked laser devices as that of the wavelengths contained in the inputted wavelength-division multiplexed light signals, and inserting optical switches for all these devices.

The third embodiment of the present invention will be described next with reference to FIG. 3. In this embodiment, the optical add-drop device described above is remotely controlled, making it possible to selectively set the signal light to be transmitted or branched by this optical add-drop device from a land terminal station or other remote location.

Figure 3:
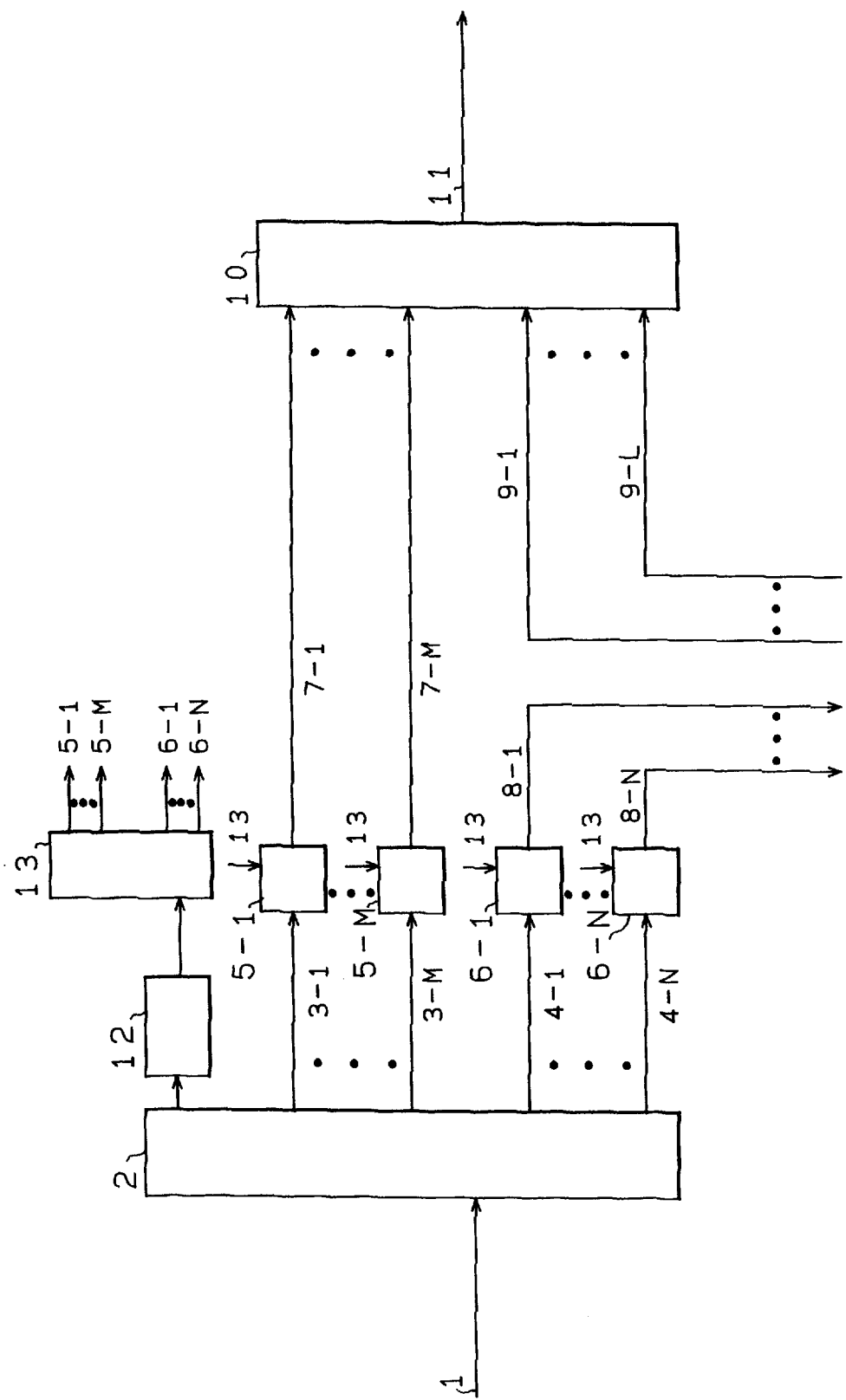
FIG. 3 is a diagram depicting the third embodiment of the optical add-drop device of the present invention.

The constituent elements in FIG. 3 that are identical to those in FIG. 1 above are assigned identical symbols to prevent repeating the same description. In the drawing, 12 is an optical receiver, and 13 is a control circuit for controlling the driving current or operation temperature of the injection-locked laser devices 5-1 through 5-M and 6-1 through 6-N and to control the self-oscillation frequencies of these devices. As can be seen in the drawing, this embodiment is different from the first embodiment described above by the provision of the aforementioned optical receiver 12 and the aforementioned control circuit 13.

As described above, the injection-locked laser devices amplify inputted signal light when this light is phase- or frequency-modulated. In the above description, the premise was that the wavelength-division multiplexed light signals inputted from the input optical line 1 were phase- or frequency-modulated light. In view of this fact, the control signals for controlling the self-oscillation frequency of the injection-locked laser devices 5-1 through 5-M and 6-1 through 6-N are sent out from a land terminal equipment or other remote location on any intensity-modulated signal light selected from among the aforementioned wavelength-division multiplexed signal lights.

In this structure, wavelength-division multiplexed light signals containing intensity-modulated signal light inputted from the input optical line 1 are split in the optical splitter 2 in the same manner as described above, and are outputted to the optical lines 3-1 through 3-M and 4-1 through 4-N, but some of these signals are outputted to the optical receiver 12 as well. The aforementioned control signals, which are intensity-modulated with the aforementioned signal light, are demodulated in the optical receiver 12, and the demodulated control signals are fed to the control circuit 13. The control circuit 13 generates signals for controlling the driving voltage, operation temperature, or other operating conditions of the corresponding injection-locked laser devices 5-1 through 5-M and 6-1 through 6-N on the basis of the demodulated control signals, and feeds the signals to the injection-locked laser devices. The self-oscillation frequencies of the injection-locked laser devices are thus adjusted to the set frequency.

Thus, with this embodiment, the setting of the transmitted or branched signal lights in this optical add-drop device can be controlled from a remote location even after the network has been created. The network structure can therefore be changed as needed.

As described above, a characteristic of an injection-locked laser device is that information about phase or frequency modulation is outputted unchanged but information about light intensity modulation is suppressed. The result is that in the third embodiment described above, the remote control signals superposed on signal lights are suppressed in such injection-locked laser devices. This result presents a problem when an attempt is made to transmit the remote control signals to the subsequent stage.

Figure 4:
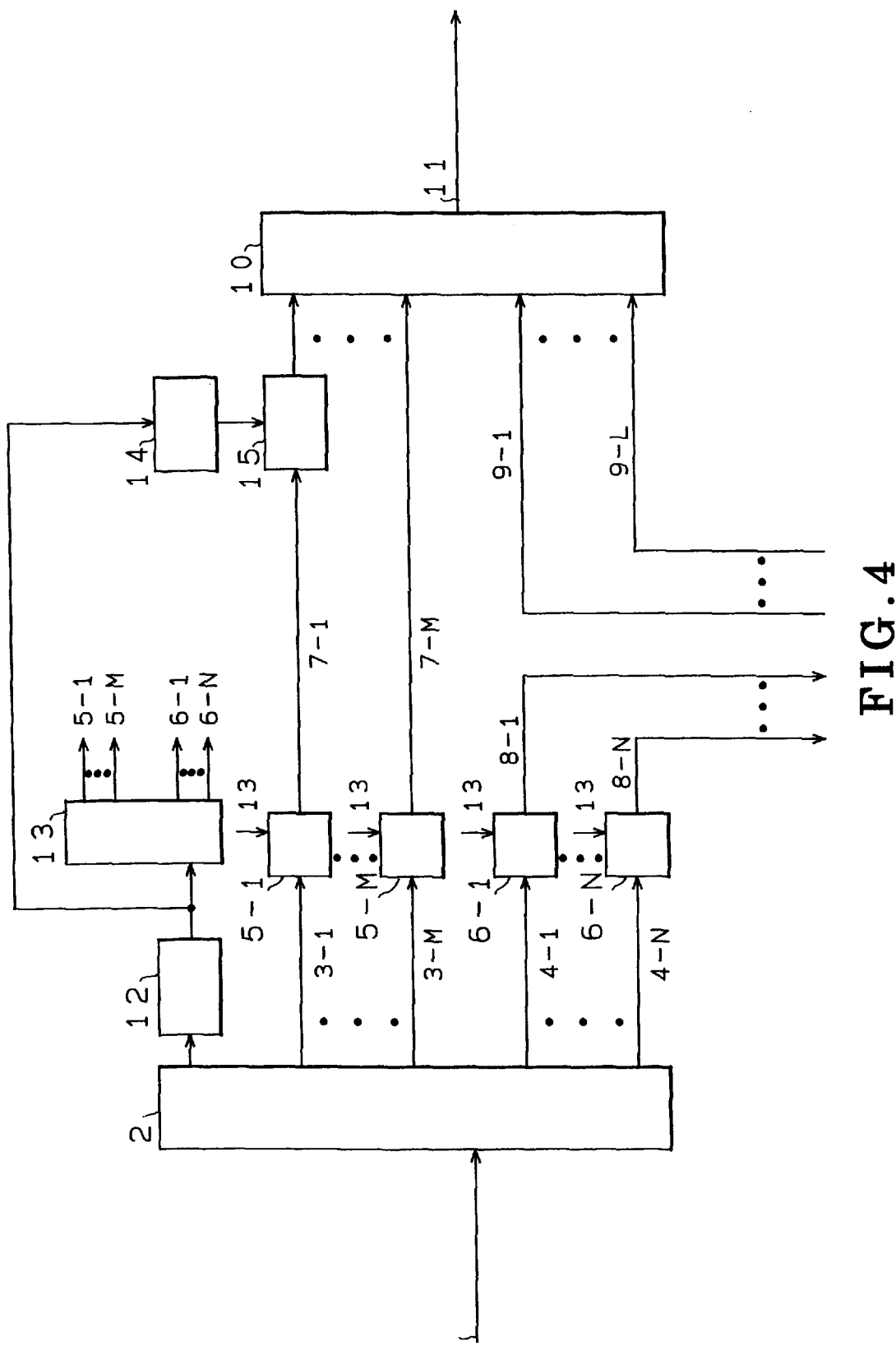
FIG. 4 is a diagram depicting the fourth embodiment of the optical add-drop device of the present invention.
Figure 5:
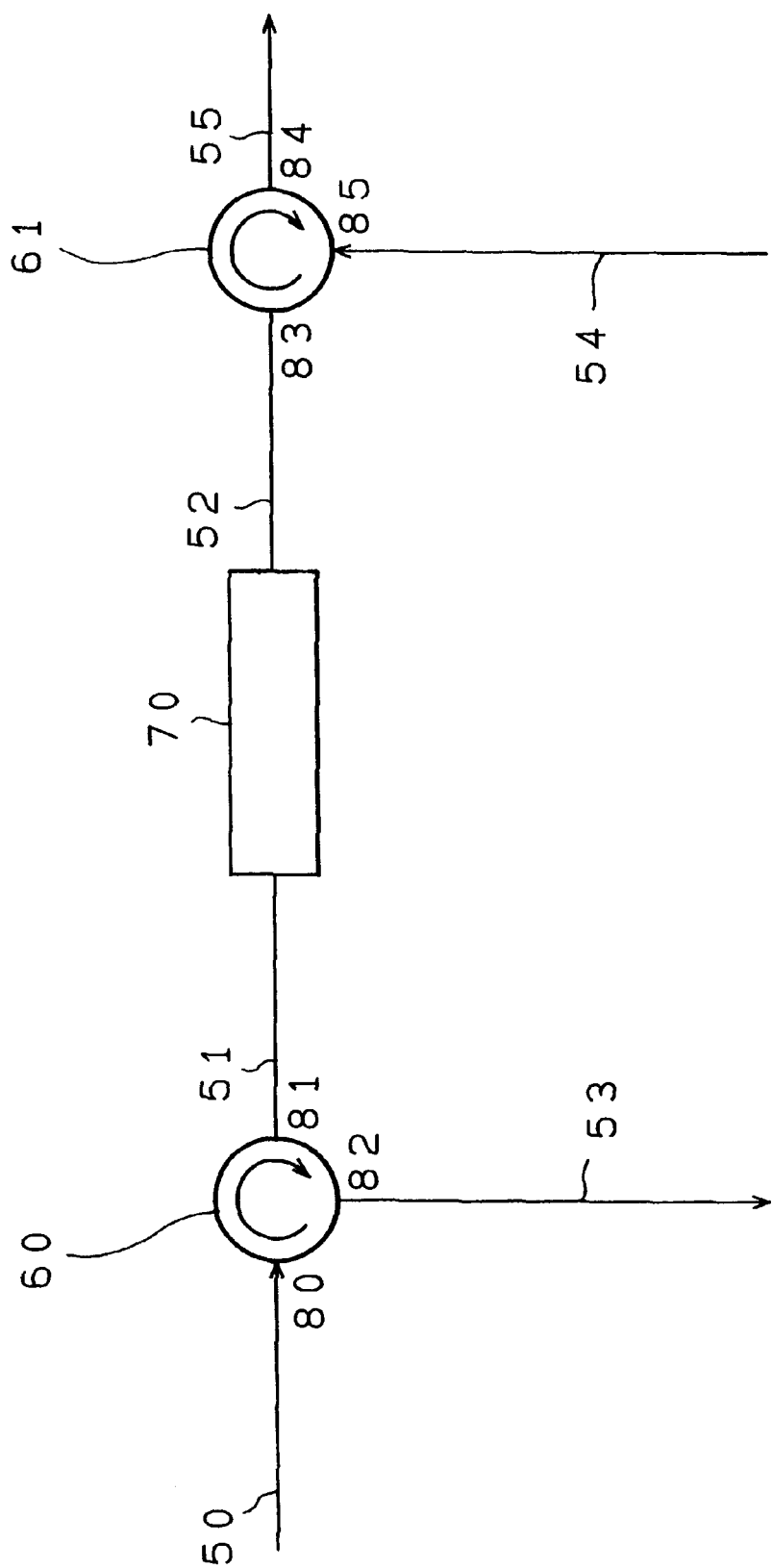
FIG. 5 is a diagram depicting the structure of a conventional optical add-drop device.

FIG. 4 depicts the fourth embodiment of the present invention, which is designed to address this problem. In the drawing, the constituent elements identical to those in FIG. 3 above are assigned identical symbols to prevent repeating the same description. 14 is an optical light modulator driving device to which the output of the aforementioned optical receiver 12 is inputted, and 15 is an optical intensity modulator inserted into the aforementioned optical line 7-1. The provision of these devices Is the feature that distinguishes this embodiment from the embodiment depicted in FIG. 3 above.

Let us assume that the input optical line 1 of such a structure passes wavelength-division multiplexed light signals in which any signal light is intensity modulated with control signals (for example, signal light having the wavelength selected in the injection-locked laser device 5-1) in the same manner as in FIG. 3 described above. The aforementioned control signals are demodulated in the optical receiver 12 and are applied by the control circuit 13 in a corresponding fashion to the respective injection-locked laser devices in the same manner as in FIG. 3 above.

The control signals demodulated in the aforementioned optical receiver 12 are inputted to the optical modulator driver 14, and this optical modulation driver 14 outputs modulation to be fed to the optical modulator 15 on the basis of these control signals. The optical modulator 15 thus subjects the light signals in the optical line 7-1 to intensity modulation and presents the optical combiner 10 with signal light that has been intensity-modulated for the second time with the control signals.

As a result, control signal information is again used to modulate the intensity of signal light in which information about intensity modulation has been suppressed in the aforementioned injection-locked laser device 5-1, making it possible to transmit this control signal information to the subsequent stage.

In this embodiment, signal light that has undergone intensity modulation with a control signal to be sent to the optical line containing the aforementioned inserted optical modulator 15, that is, to the subsequent stage, is not necessarily signal light whose wavelength is the same as that of the signal light that has been intensity-modulated when this control signal was inputted to the optical add-drop device, and can be established as needed in accordance with the specifications or the like of the optical receiver in the optical add-drop device of the subsequent stage. It is also possible to insert an optical modulator into an inserting optical line and to superpose a control signal with the signal light inserted in the optical add-drop device.

Although a plurality of branching optical lines 8-1 through 8-N and a plurality of inserting optical lines 9-1 through 9-L has been referred to in the above description, it is also possible to use a single branching optical line and a single inserting optical line by providing an optical combiner for combining the signals of the aforementioned branching optical lines 8-1 through 8-N and an optical combiner for combining the signals of the aforementioned inserting optical lines 9-1 through 9-L on the terminal station side in order to reduce the number of optical lines connected between the terminal stations that receive branched and inserted signal light.

The optical add-drop devices of the present invention allows an arbitrary number of signal lights having arbitrary wavelengths to be branched or inserted, making it possible to provide an optical add-drop device that does not require that a match be achieved between the wavelength of the signal light outputted from a branching optical line and the wavelength of the signal light inputted from an inserting optical line, and to configure a network in a flexible manner.

It is also possible to provide an optical add-drop device in which the inputted phase- or frequency-modulated, wavelength-division multiplexed light signals can be amplified, and the noise reduced.

It is further possible to selectively control the signal light branched or inserted in the optical add-drop device by performing remote control from a land terminal station device or other remote location, and to easily vary the system structure.

What is claimed is:

1. An optical add-drop device, comprising:
   an optical splitter for splitting wavelength-division multiplexed light signals inputted from an input optical line between two or more optical lines;
   a first injection-locked laser device group composed of injection-locked laser devices connected in a corresponding manner to some of said two or more optical lines;
   a second injection-locked laser device group composed of injection-locked laser devices connected in a corresponding manner to the rest of said two or more optical lines;
   optical lines connected to the corresponding outputs of the injection-locked laser devices belonging to said first injection-locked laser device group;
   branching optical lines connected to the corresponding outputs of the injection-locked laser devices belonging to said second injection-locked laser device group;
   inserting optical lines for inputting light signals from the outside; and
   an optical combiner for combining the outputs of said inserting optical lines and the optical lines connected to the corresponding outputs of the injection-locked laser devices belonging to said first injection-locked laser device group.

2. An optical add-drop device as defined in claim 1, further comprising:
   an optical receiver for receiving light signals that have been split by said optical splitter; and
   a control circuit for receiving the output of said optical receiver and controlling the self-oscillation frequency of said injection-locked laser devices.

3. An optical add-drop device as defined in claim 2, further comprising:
   an optical modulation driver connected to the output of said optical receiver; and
   an optical modulator that is connected to the output of said optical modulation driver and that is inserted into one of the optical lines connected to the corresponding outputs of the injection-locked laser devices belonging to said first injection-locked laser device group.

4. An optical add-drop device, comprising:
   an optical splitter for splitting wavelength-division multiplexed light signals inputted from an input optical line between two or more optical lines;
   a plurality of injection-locked laser devices connected in a corresponding manner to said two or more optical lines;
   an optical combiner for combining the outputs of a plurality of optical lines; and
   at least one optical switch having a first state, in which a direct connection is made between the input-side optical lines connected to the output sides of said injection-locked laser devices and the output-side optical lines connected to the input side of said optical combiner, and a second state, in which a connection is made between said input-side optical lines and the branching optical lines for outputting light signals to the outside and between said output-side optical lines and the inserting optical lines for inputting light signals from the outside.

5. An optical add-drop device as defined in claim 4, further comprising:
   an optical receiver for receiving light signals that have been split by said optical splitter; and
   a control circuit for receiving the output of said optical receiver and controlling the self-oscillation frequency of said injection-locked laser devices.

6. An optical add-drop device as defined in claim 5, further comprising:
   an optical modulation driver connected to the output of said optical receiver; and
   an optical modulator that is connected to the output of said optical modulation driver and that is inserted into one of the optical lines connected to the corresponding outputs of the injection-locked laser devices belonging to said first injection-locked laser device group.

7. An optical add-drop device, comprising:
   an optical splitter for splitting wavelength-division multiplexed light signals inputted from an input optical line between two or more optical lines;
   a plurality of injection-locked laser devices connected in a corresponding manner to said two or more optical lines;
   at least one optical switch having a first state in which a direct connection is made between input-side optical lines and output-side optical lines, and a second state in which a connection is made between the input-side optical lines and branching optical lines and between the output-side optical lines and inserting optical lines;

an optical combiner for combining the outputs of a plurality of optical lines;

splitting optical lines for outputting light signals to the outside; and inserting optical lines for inputting light signals from the outside, wherein the outputs of said plurality of injection-locked laser devices are connected in a corresponding manner to the input-side optical lines of said optical switch, to the optical lines connected to said optical combiner, or to the branching optical lines, and said inserting optical lines are connected to said optical switch or to said optical combiner.

8. An optical add-drop device as defined in claim 7, further comprising:

an optical receiver for receiving light signals that have been split by said optical splitter; and a control circuit for receiving the output of said optical receiver and controlling the self-oscillation frequency of said injection-locked laser devices.

9. An optical add-drop device as defined in claim 8, further comprising:

an optical modulation driver connected to the output of said optical receiver; and an optical modulator that is connected to the output of said optical modulation driver and that is inserted into one of the optical lines connected to the corresponding outputs of the injection-locked laser devices belonging to said first injection-locked laser device group.

* * * * *